(12) United States Patent
Fukano et al.

(10) Patent No.: US 9,164,008 B2
(45) Date of Patent: Oct. 20, 2015

(54) PRESSURE DETECTOR

(71) Applicant: SMC KABUSHIKI KAISHA, Chiyoda-ku (JP)

(72) Inventors: Yoshihiro Fukano, Moriya (JP); Tadashi Uchino, Moriya (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 181 days.

(21) Appl. No.: 13/741,684

(22) Filed: Jan. 15, 2013

(65) Prior Publication Data

US 2013/0205907 A1  Aug. 15, 2013

(30) Foreign Application Priority Data

Feb. 9, 2012  (JP) ................ 2012-025755

(51) Int. Cl.
*G01L 7/08* (2006.01)
*G01L 13/02* (2006.01)
*G01L 19/00* (2006.01)
*G01L 19/06* (2006.01)

(52) U.S. Cl.
CPC ............... *G01L 7/08* (2013.01); *G01L 19/0023* (2013.01); *G01L 19/0038* (2013.01); *G01L 19/0645* (2013.01)

(58) Field of Classification Search
CPC combination set(s) only.
See application file for complete search history.

(56) References Cited

U.S. PATENT DOCUMENTS

| 5,043,841 | A | 8/1991 | Bishop et al. |
| 5,542,300 | A | 8/1996 | Lee |
| 5,834,652 | A | 11/1998 | Koshimizu |
| 5,869,766 | A | 2/1999 | Cucci et al. |
| 7,100,454 | B2 | 9/2006 | Hasunuma |
| 2002/0059833 | A1 | 5/2002 | Imai |

FOREIGN PATENT DOCUMENTS

| JP | 60-135639 U | 9/1985 |
| JP | 2-236431 | 9/1990 |
| JP | 3-94132 | 4/1991 |
| JP | 8-178785 | 7/1996 |
| JP | 9-166512 | 6/1997 |
| JP | 9-510778 A | 10/1997 |
| JP | 11-512827 | 11/1999 |
| JP | 2005-207946 | 8/2005 |
| JP | 2006-125982 | 5/2006 |

OTHER PUBLICATIONS

Japanese Office Action issued Oct. 22, 2013, in Japan Patent Application No. 2012-025755 (with Partial English translation).
Office Action issued Feb. 24, 2014 in Korean Patent Application No. 10-2013-0013215 (with English language translation).
Combined Chinese Office Action and Search Report issued Jul. 23, 2014 in Patent Application No. 201310046333.3 (with English language translation).

*Primary Examiner* — Lisa Caputo
*Assistant Examiner* — Brandi N Hopkins
(74) *Attorney, Agent, or Firm* — Oblon, McClelland, Maier & Neustadt, L.L.P.

(57) ABSTRACT

The present invention relates to a pressure detector. In a body that constitutes part of the pressure detector, a through hole is formed, which is directed upwardly from a substantially central portion of a flow passage through which a pressure fluid flows. The through hole communicates with a sensor chamber in which a pressure sensor is disposed, and a rod-shaped member is disposed displaceably in the through hole. In addition, an end of the rod-shaped member, which is exposed to the flow passage, is pressed by the pressure fluid and displaced upwardly thereby, and pressure is detected as a result of the pressure sensor being pressed by a head of the rod-shaped member.

10 Claims, 6 Drawing Sheets

PRESSURE DETECTOR

CROSS-REFERENCE TO RELATED APPLICATION

This application is based upon and claims the benefit of priority from Japanese Patent Application No. 2012-025755 filed on Feb. 9, 2012, the contents of which are incorporated herein by reference.

BACKGROUND OF THE INVENTION

1. Field of the Invention

The present invention relates to a pressure detector for detecting the pressure of a fluid that flows through the interior of a flow passage.

2. Description of the Related Art

Heretofore, for example, in a manufacturing process for semiconductor manufacturing or the like, liquids consisting of chemicals and pure water or the like are used, and a pressure detector is connected with respect to tubes through which such liquids are made to flow, whereby measurement of the pressure of the liquid that flows through the interior of the tubes is carried out by the pressure detector.

As one type of such a pressure detector, for example, as disclosed in Japanese Laid-Open Patent Publication No. 11-512827 (PCT) (Patent Document 1), a disk membrane is provided between an internally disposed pressure sensor, which is connected with respect to a fluid flow circuit through which a corrosive liquid flows, and a hole portion that the corrosive liquid flows into, whereby the pressure sensor is separated from and is prevented from coming into direct contact with the corrosive liquid. In this case, a fluid pressure, which is transmitted through the disk membrane, is detected by the pressure sensor.

Further, in Japanese Laid-Open Patent Publication No. 09-166512 (Patent Document 2), a fluid pressure sensor is disclosed in which the pressure sensor is built into the interior of a tube fitting, and the pressure sensor is separated from the fluid by a diaphragm, which is disposed between the pressure sensor and a flow passage through which the pressure fluid flows.

Furthermore, in the pressure sensor disclosed in Japanese Laid-Open Patent Publication No. 2005-207946 (Patent Document 3), a recessed upper surface is provided, which is located at an intermediate portion of a flow passage connected between an upstream side connection port and a downstream side connection port, and fluid pressure measurement is carried out by arranging the pressure receiving surface of a sensor main body so as to face an opening of the flow passage, which opens at a top part of the recessed upper surface.

SUMMARY OF THE INVENTION

However, with the conventional technique disclosed in Patent Document 1, since the disk membrane is arranged in an upwardly offset position with respect to the hole portion through which the corrosive liquid flows, a dead space is created between the hole portion and the disk membrane. Further, similarly, in the conventional technique disclosed in Patent Document 2, a dead space is created between the diaphragm and the fluid passage. Due to such dead spaces, smooth flowing of the fluid is hindered, and there is a concern that pooling of liquid or retention of debris or the like may occur within the dead space. For this reason, if such a pressure detector is used for measuring the pressure of a fluid such as ultrapure water or the like used in a semiconductor manufacturing apparatus, bacteria or the like may develop within the dead space. Further, it is easy for air bubbles (air) to become attached inside the dead space, so that collection of air due to such air bubbles tends to occur, and high precision measurement of pressure cannot be performed.

On the other hand, with the conventional technique disclosed in Patent Document 3, for avoiding the problems of the dead space discussed above, a mountain-shaped curved portion is provided in the center of the flow passage. However, since flow passage resistance occurs in the fluid that flows through the curved portion, pressure loss tends to increase, and further, a sufficient flow rate cannot be assured.

Furthermore, with the pressure detectors disclosed in Patent Documents 1 through 3, the distance between the flow passage through which the fluid flows and the pressure sensor itself is extremely short, while in addition, since the pressure sensor is arranged and separated from the fluid merely by a disk membrane or a diaphragm or the like, for example, in the event there is a change in the temperature of the fluid, a concern exists that such a change may adversely influence the pressure measurement made by the pressure sensor.

A general object of the present invention is to provide a pressure detector that avoids a dead space therein that impedes the smooth flow of fluid, and which by preventing the influence of temperature changes of the fluid, enables pressure measurements of the fluid to be carried out with high accuracy.

The present invention is a pressure detector including a body having a flow passage therein through which a fluid flows, a sensor chamber provided in the body and in which a pressure sensor is arranged, and a through hole that extends from the flow passage to the sensor chamber. A pressure transmitting body is disposed in the through hole and is displaceable along an axial direction in the through hole, such that the pressure transmitting body is capable of transmitting a pressure of the fluid to the pressure sensor. One end of the pressure transmitting body extends in the through hole to an end on the side of the flow passage, such that the one end is constantly exposed to the fluid.

According to the present invention, in the pressure detector, the pressure transmitting body is disposed displaceably in the through hole that communicates between the flow passage through which the fluid flows and the sensor chamber in which the pressure sensor is disposed. Further, one end of the pressure transmitting body extends in the through hole to an end on the side of the flow passage, and the one end is constantly exposed to the fluid. Thus, creation of a dead space in the through hole is prevented, pooling of liquid or generation of air bubbles due to such a dead space can reliably be prevented, and detection of pressure can be carried out with high precision. Further, since the pressure sensor can be disposed at a location distanced from the fluid, degradation of the detection accuracy of the pressure sensor due to the temperature of the fluid can be prevented, and detection of pressure with high accuracy can be performed.

The above and other objects features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
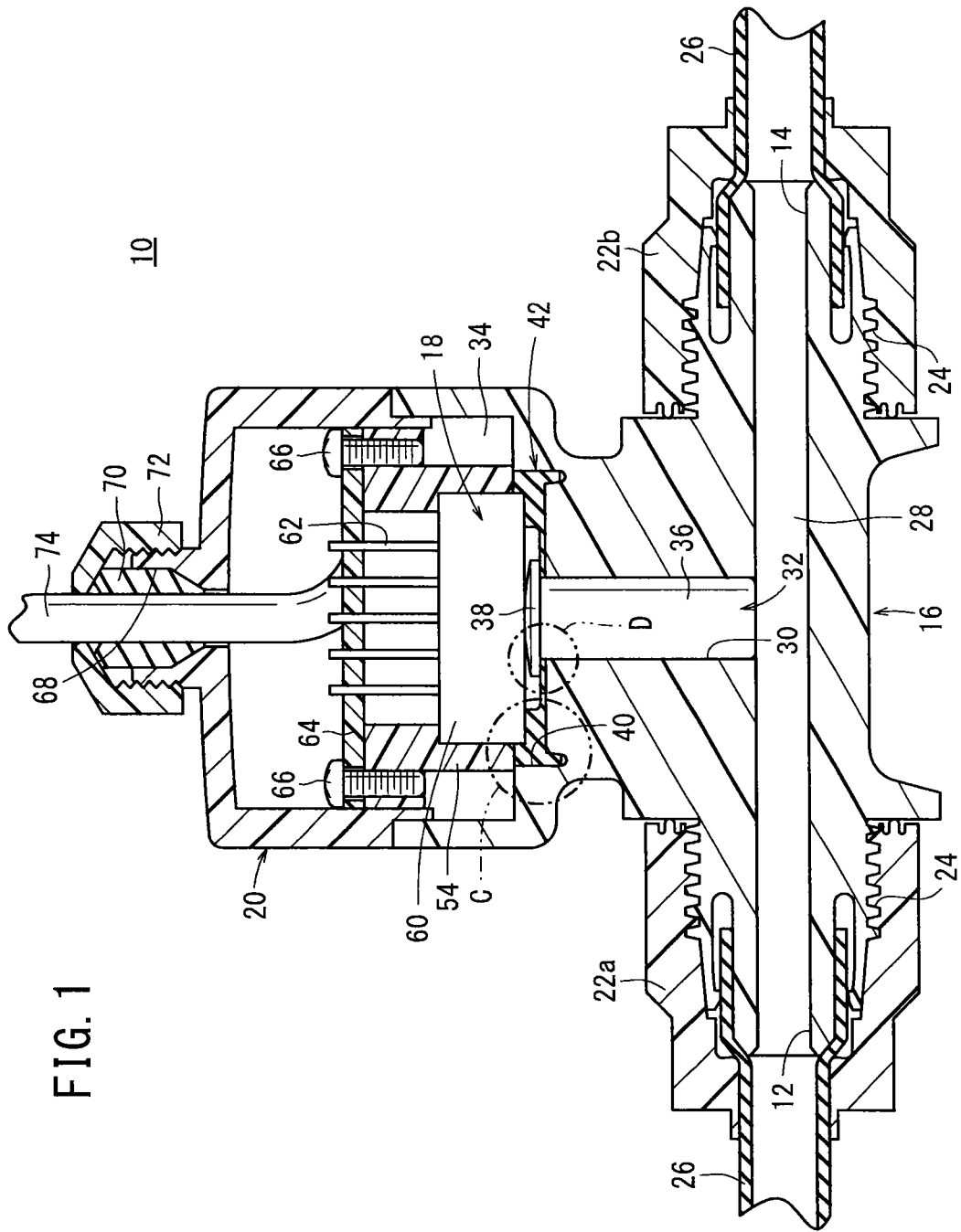
FIG. 1 is an overall cross sectional view of a pressure detector according to a first embodiment of the present invention.
Figure 2:
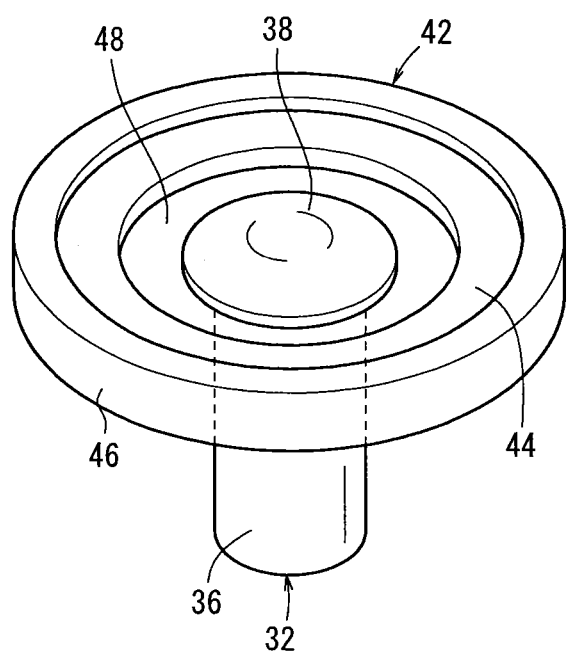
FIG. 2 is an exterior perspective view as seen from above of a rod-shaped member and a seal member in the pressure detector of FIG. 1.

As shown in FIGS. 1 through 4, the pressure detector 10 includes a body 16 having first and second ports 12, 14 through which a pressure fluid is supplied and discharged, a pressure sensor 18 disposed on an upper part of the body 16, and a lid member 20 that closes and blocks the upper part of the body 16. For the aforementioned pressure fluid, for example, there may be used a chemical liquid or pure water, which is used in a semiconductor manufacturing apparatus.

The body 16 is formed from a resin material, for example. The first port 12 opens on one side of the body 16, and the second port 14 opens on another side of the body 16. The first and second ports 12, 14 open horizontally, and on the outer circumferential surfaces thereof, screw threads 24 are engraved to which fastening members 22a, 22b are screw-engaged.

In addition, after tubes 26 have been inserted respectively over the outer circumferential sides of the first and second ports 12, 14, the tubes 26 are fastened and connected respectively to the first and second ports 12, 14 by screw-engagement of the cylindrical fastening members 22a, 22b, through which the aforementioned tubes 26 have been inserted, with respect to the screw threads 24.

A non-illustrated pressure fluid supply source is connected to the first port 12 via the tube 26, for example, whereas a separate apparatus, which has a need for the pressure fluid, is connected to the second port 14 via the tube 26.

Between the first port 12 and the second port 14, a flow passage 28 is formed in a straight line so as to connect the two ports, and so that the first port 12 and the second port 14 are placed in communication through the flow passage 28.

Further, in the body 16, a through hole 30 is formed that extends in an upward direction perpendicularly with respect to the flow passage 28, and which is formed in a roughly central portion of the flow passage 28. A rod-shaped member (pressure transmitting body) 32 is inserted displaceably in the through hole 30. The through hole 30 is formed with a substantially constant diameter along the axial direction, and by extending from the flow passage 28 to a sensor chamber 34, which is formed on the upper part of the body 16, communication is established mutually between the flow passage 28 and the sensor chamber 34.

The rod-shaped member 32 is constituted from a shaft-like body formed with a substantially constant diameter from an elastic resin material, which is inserted displaceably in the through hole 30. The rod-shaped member 32 comprises a shaft-like main body portion 36, and a head 38 that is formed on an upper part of the main body portion 36. The main body portion 36 has an outer diameter which is substantially the same as the inner diameter of the through hole 30, whereas the head 38 is formed in a disk-like shape and is expanded in diameter in a radial outward direction with respect to the main body portion 36.

The axial length of the main body portion 36 is formed to be slightly longer than the axial length of the through hole 30, such that the lower end of the main body portion 36 is disposed at a boundary region between the through hole 30 and the flow passage 28. Consequently, in the interior of the through hole 30, a dead space is not created into which the pressure fluid can flow. Further, the upper portion of the head 38 of the rod-shaped member 32 is formed with a curved shape, which protrudes convexly in an upward direction.

Furthermore, for the material of the rod-shaped member 32, there may be used a material having water resistance or chemical resistance, corresponding to the type of pressure fluid that flows through the flow passage 28.

The sensor chamber 34 is formed in a bottomed shape and opens in an upward direction. On the bottom thereof, a seal mounting portion 40 is formed, which is recessed toward the side of the flow passage 28. A seal member 42 formed, for example, from an elastic material is mounted on the seal mounting portion 40.

The seal member 42 is made from an elastic material such as rubber or the like, and includes an annular base section 44, an outer edge section 46 formed on an outer circumferential side of the base section 44 and which projects perpendicularly with respect to the base section 44, and a thin film shaped skirt section 48 that extends radially inward with respect to the base section 44. The seal member 42 may be formed from an elastic material such as Teflon (registered trademark) or the like.

The base section 44, for example, is formed as a flat plate having a predetermined thickness. The base section 44 abuts against a bottom surface of the seal mounting portion 40, whereas the pressure sensor 18 abuts against the upper surface of the base section 44. More specifically, the base section 44 is gripped between the pressure sensor 18 and the seal mounting portion 40.

Figure 3:
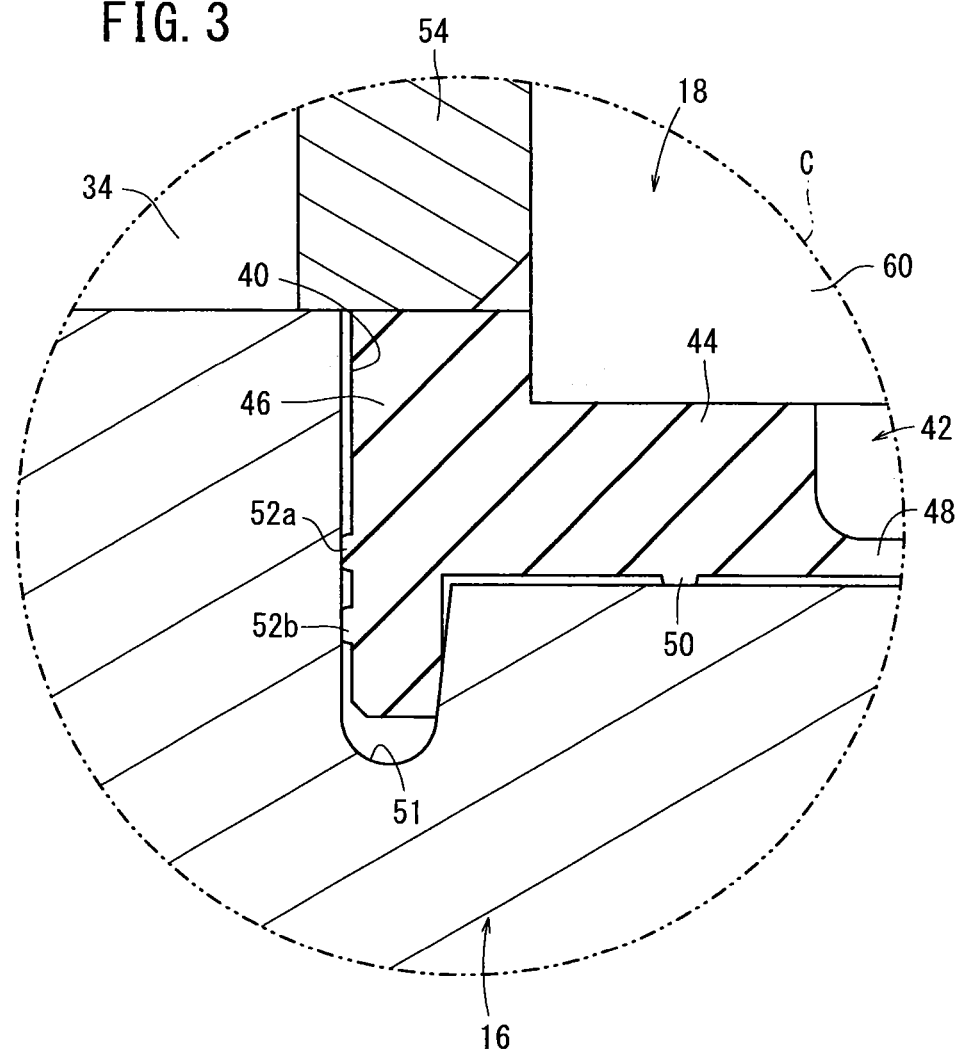
FIG. 3 is an enlarged cross sectional view of a region C in the vicinity of an outer edge of the seal member in the pressure detector of FIG. 1.

Further, as shown in FIG. 3, a first projection (annular projection) 50, which is semicircular in cross section, projects downwardly on the lower surface of the base section 44 and abuts against the bottom surface of the seal mounting portion 40. Owing thereto, leakage of pressure fluid from between the body 16 and the base section 44 of the seal member 42 is prevented by the first projection 50.

The outer edge section 46 is inserted into an annular groove 51 formed in the seal mounting portion 40, and on the outer circumferential surface thereof, a pair of second projections (annular projections) 52a, 52b are formed, and abuts against the wall surface of the annular groove 51. The second projections 52a, 52b, for example, are semicircular in cross section and project in a radial outward direction with respect to the outer circumferential surface of the outer edge section 46, and are separated mutually from each other. In addition, by abutment of the second projections 52a, 52b against the annular groove 51, passage of pressure fluid toward the side of the sensor chamber 34 from between the annular groove 51 and the outer edge section 46 of the seal member 42 is prevented.

A hole 53 (see FIG. 4) is formed in the center of the skirt section 48, and the rod-shaped member 32 is inserted through the hole 53. In addition, in a state in which the seal member 42 is mounted on the seal mounting portion 40, the outer edge section 46 is fixed with respect to the body 16 through a later-described holder 54, and the skirt section 48 is retained as a result of being gripped between the head 38 of the rod-shaped member 32 and the body 16.

Figure 4:
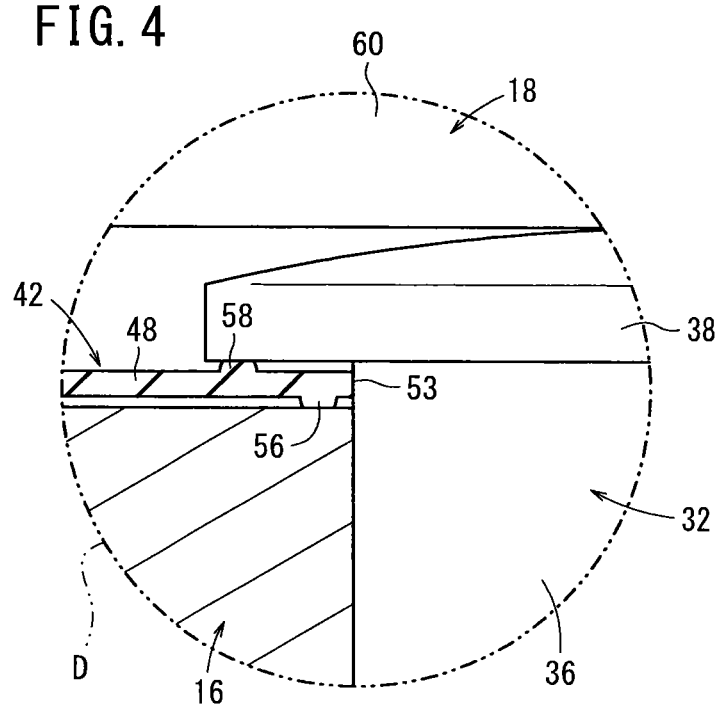
FIG. 4 is an enlarged cross sectional view showing a region D in the vicinity of a head of the rod-shaped member in the pressure detector of FIG. 1.

Further, as shown in FIG. 4, in the vicinity of the hole 53 in the skirt section 48, an annular third projection (annular projection) 56 is formed, which projects downwardly from the lower surface, and an annular fourth projection (annular projection) 58 is formed, which projects upwardly from the upper surface of the skirt section 48. In addition, the third projection 56 abuts against the seal mounting portion 40 of the body 16, so that leakage of pressure fluid from between the seal mounting portion 40 and the skirt section 48 is prevented. On the other hand, by abutment of the fourth projection 58 against the head 38 of the rod-shaped member 32, leakage of pressure fluid from between the skirt section 48 and the head 38 is prevented.

The pressure sensor 18, for example, is capable of converting a pressing force from the exterior into an electric signal and outputting the electric signal. The pressure sensor 18 is equipped with a sensor element 60, which is disposed in the sensor chamber 34 on upper portions of the seal member 42 and the rod-shaped member 32, and terminals 62, which are connected to the sensor element 60. The terminals 62 also are connected electrically to a circuit board 64. A lead wire 74 is connected to the circuit board 64 for outputting, to the exterior, pressure values detected by the pressure sensor 18.

The sensor element 60 is disposed such that the head 38 of the rod-shaped member 32 abuts against a central portion of the lower surface thereof, which functions as a pressure receiving surface for receiving a pressing force, whereas the base section 44 of the seal member 42 abuts against a peripheral portion thereof. In addition, the sensor element 60 is fixed in the interior of the sensor chamber 34 by a holder 54 to which the circuit board 64 is fastened by bolts 66.

The lid member 20 is connected to an upper part of the body 16 so as to cover the sensor chamber 34, and is formed with an extraction hole 68 in a central portion thereof through which the lead wire 74 is inserted. By insertion of the lead wire 74 through the extraction hole 68, and by fastening of a nut 72 thereon together with a pressing member 70, the lead wire 74 is fixed with respect to the lid member 20.

The pressure detector 10 according to the first embodiment of the present invention basically is constructed as described above. Next, operations and advantages of the pressure detector 10 shall be explained.

First, in an initial state in which pressure fluid is not flowing through the flow passage 28 of the body 16, since a pressing force from the pressure fluid is not imposed on the lower end of the rod-shaped member 32, the rod-shaped member 32 is not pressed and displaced toward the side of the pressure sensor 18, and the pressure sensor 18 is in a condition of not being pressed by the head 38. Thus, no pressure is detected by the pressure sensor 18.

Next, when a pressure fluid is supplied to the first port 12 on the upstream side, and the pressure fluid passes through the flow passage 28 and flows to the second port 14, as a result of the pressure of the pressure fluid inside the flow passage 28, the lower end of the rod-shaped member 32 is pressed upwardly, and the rod-shaped member 32 is compressed in an axial direction along the through hole 30. As a result, the sensor element 60 of the pressure sensor 18 is pressed by the head 38 of the rod-shaped member 32, and based on the pressing force (pressure amount) an electric signal is output by the sensor element 60 to the circuit board 64 from the terminals 62. Thus, the pressure of the pressure fluid is detected in the pressure sensor 18, and is output externally through the lead wire 74.

On the other hand, from the above condition, in the case of a decrease in the pressure of the pressure fluid, the pressing force against the rod-shaped member 32 by the fluid is decreased. Accompanying such a decrease, the upwardly compressed state of the rod-shaped member 32 is released, and the pressing force (pressure amount) on the pressure sensor 18 is reduced. Therefore, the electric signal based on the pressing force is output from the pressure sensor 18, whereby it can be confirmed that the pressure of the pressure fluid has been lowered.

More specifically, the rod-shaped member 32 is disposed for displacement along the through hole 30 at a displacement amount which corresponds to the pressure of the pressure fluid flowing in the flow passage 28.

Further, in this case, although the pressure fluid flows from the flow passage 28 into a space between the outer circumferential surface of the rod-shaped member 32 and the through hole 30, since the seal member 42, which is made from an elastic material, is disposed between the rod-shaped member 32 and the sensor element 60 of the pressure sensor 18, the pressure fluid is prevented from flowing to the side of the pressure sensor 18 (into the sensor chamber 34).

In greater detail, on the seal member 42, since the first projection 50 is provided on the base section 44 that abuts against the body 16, leakage of the pressure fluid to the side of the annular groove 51 of the seal mounting portion 40 is prevented. Further, since the pair of second projections 52a, 52b is provided on the outer edge section 46, leakage of the pressure fluid to the side of the sensor chamber 34 from the annular groove 51 is prevented. Still further, since the third and fourth projections 56, 58 are provided respectively on the lower surface and the upper surface of the skirt section 48, leakage of pressure fluid to the side of the sensor chamber 34 from between the seal member 42 and the rod-shaped member 32 is prevented.

In the foregoing manner, according to the first embodiment, in the pressure detector 10, the rod-shaped member 32 is disposed displaceably in the through hole 30 that communicates between the sensor chamber 34 in which the pressure sensor 18 is arranged and the flow passage 28 through which the pressure fluid flows. In addition, the lower end of the rod-shaped member 32 is arranged so as to extend to the end of the through hole 30. Consequently, since the pressure of the pressure fluid is transmitted to the pressure sensor 18 via the rod-shaped member 32, by disposing the rod-shaped member 32 in the interior of the through hole 30, creation of a dead space in the through hole 30 can be avoided. As a result, pooling of liquid or the occurrence of bacteria or generation of bubbles, which tend to be problematic in the case that a dead space is created, can reliably be prevented, and the pressure of the pressure fluid can be detected with high accuracy.

Further, since the sensor element 60 of the pressure sensor 18 can be arranged at a predetermined distance from the flow passage 28 through which the pressure fluid flows, lowering of the detection accuracy of the pressure sensor 18 due to the temperature of the pressure fluid can be prevented, and detection of pressure with high accuracy can be performed.

Furthermore, since the rod-shaped member 32 is configured to receive the pressure of the pressure fluid, the seal member 42 does not directly receive the pressure, and a reduction in durability, which would be of concern if the seal member 42 were deformed excessively, can be avoided.

Still further, the flow passage 28 is formed in a straight line along the axial direction, and since a curved part and a projection, as in the pressure detector according to the conventional technique, are not required to be provided in the flow passage 28, the pressure fluid can be made to flow smoothly, and thus the pressure of the pressure fluid can be detected more reliably.

Still further, by separately constructing the rod-shaped member 32, which is in direct contact with the pressure fluid, and the seal member 42, which is not in direct contact with the pressure fluid, it is possible for the rod-shaped member 32 and the seal member 42 to be formed from different materials. Thus, for example, in the case that the pressure fluid is a chemical liquid or the like, advantageously, only the rod-shaped member 32 needs to be formed from a material that is chemically resistant, whereas the seal member 42 can be formed from a material possessing elasticity such as Teflon (registered trademark) or the like.

Further, since the head 38 of the rod-shaped member 32 is formed with an upwardly projecting curved shape, the sensor element 60 of the pressure sensor 18 can reliably be pressed by a center portion of the head 38.

Figure 5:
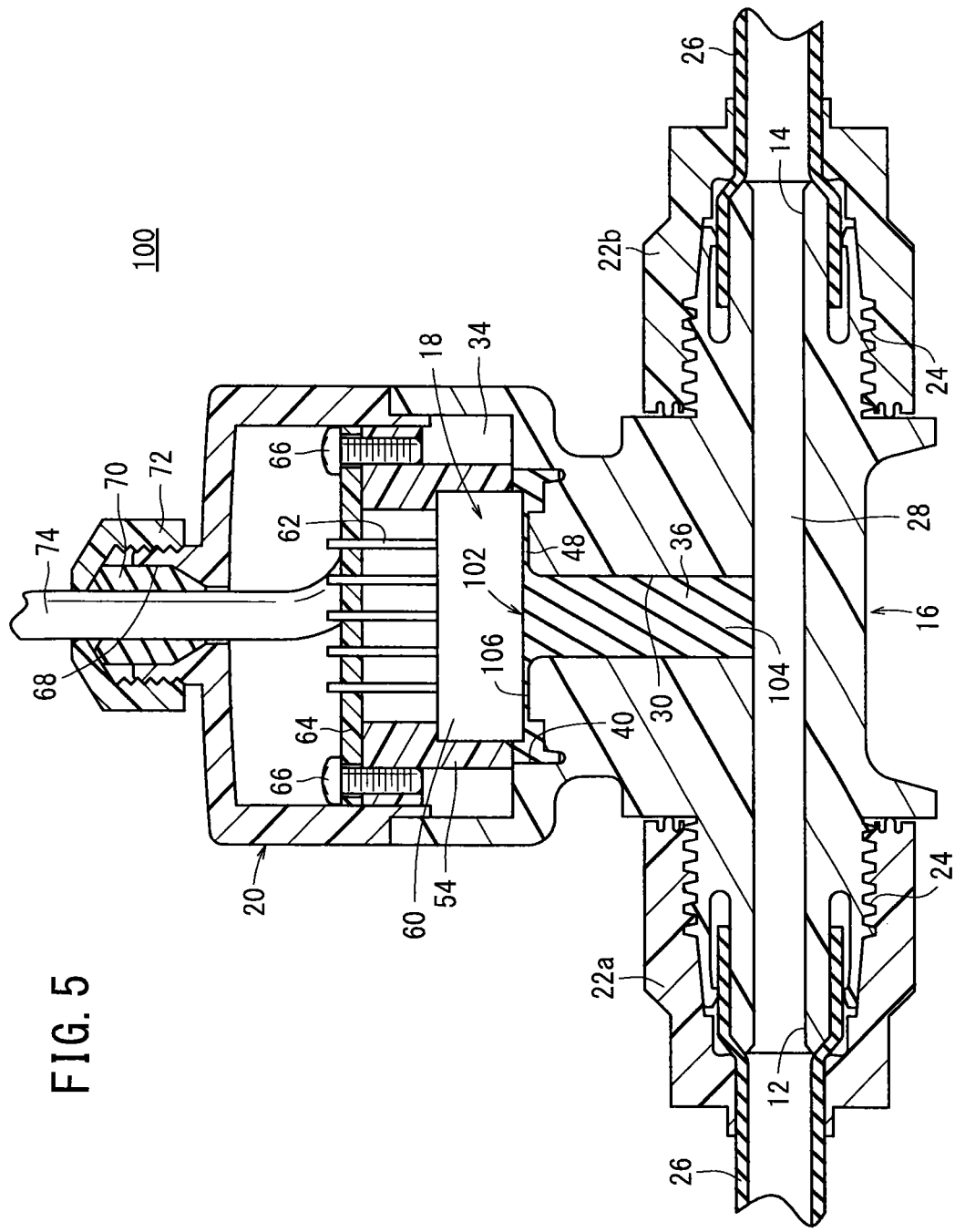
FIG. 5 is an overall cross sectional view of a pressure detector according to a second embodiment of the present invention.

Next, a pressure detector 100 according to a second embodiment is shown in FIG. 5. Constituent elements thereof, which are the same as those of the pressure detector 10 according to the first embodiment, are designated by the same reference characters, and detailed descriptions of such features are omitted.

The pressure detector 100 according to the second embodiment differs from the pressure detector 10 according to the first embodiment, in that a pressure transmitting body 102 is provided, in which the rod-shaped member 32 and the seal member 42 according to the first embodiment are formed together integrally.

As shown in FIG. 5, the pressure detector 100 is equipped with a pressure transmitting body 102. The pressure transmitting body 102 has a rod-shaped member 104 that receives the pressure of the pressure fluid, and a seal member 106 that retains a liquid-tight condition between the through hole 30 of the body 16 and the sensor chamber 34. The seal member 106 is formed integrally with an upper portion of the rod-shaped member 104. In addition, the rod-shaped member 104 is inserted displaceably in the through hole 30 of the body 16, whereas the seal member 106 is mounted on the seal mounting portion 40 formed in the sensor chamber 34.

The rod-shaped member 104 includes a shaft-like main body portion 36, and when inserted in the through hole 30, the lower end thereof is arranged so as to face toward the flow passage 28. Conversely, on an upper part of the main body portion 36, the skirt section 48 constituting the seal member 106 is joined thereto. Concerning the structure of the rod-shaped member 104, which is the same as the rod-shaped member 32 of the pressure detector 10 according to the first embodiment, detailed explanations of such features are omitted.

The skirt section 48 is formed in a thin film shape substantially in the center of the seal member 106, and the center portion thereof is joined integrally to the upper part of the rod-shaped member 104. Concerning the structure of the seal member 106, which is the same as the seal member 42 of the pressure detector 10 according to the first embodiment, detailed explanations of such features are omitted.

The pressure transmitting body 102, which is constituted from the rod-shaped member 104 and the seal member 106, is formed from an elastic resin material, for example, polypropylene or Teflon (registered trademark) or the like. The upper end of the rod-shaped member 104 is placed in abutment against the sensor element 60 of the pressure sensor 18.

Additionally, by causing a pressure fluid to flow through the flow passage 28 of the body 16, the lower end of the rod-shaped member 104 on the pressure transmitting body 102 is pressed upwardly by the pressure of the pressure fluid, and the rod-shaped member 104 is displaced slightly along the through hole 30. As a result, the sensor element 60 of the pressure sensor 18 is pressed by the rod-shaped member 104 of the pressure transmitting body 102, and based on the pressing force (pressure amount) an electric signal is output by the sensor element 60 to the circuit board 64 from the terminals 62. Thus, the pressure of the pressure fluid is detected in the pressure sensor 18, and is output externally through the lead wire 74.

At this time, in the pressure transmitting body 102, the skirt section 48 of the seal member 106 is displaced together with the rod-shaped member 104, whereupon the skirt section 48 is deformed by flexing about an adjoined region thereof with the rod-shaped member 104.

In the foregoing manner, with the pressure detector 100 according to the second embodiment, the rod-shaped member 104 of the pressure transmitting body 102 is pressed by the pressure of the pressure fluid that flows through the flow passage 28 of the body 16, whereby the sensor element 60 of the pressure sensor 18 is pressed by the upper end part of the rod-shaped member 104, and the pressure of the pressure fluid is detected. Owing thereto, by inserting the rod-shaped member 104 of the pressure transmitting body 102 in the through hole 30 of the body 16, creation of a dead space in the through hole 30 can be avoided. As a result, pooling of liquid or the occurrence of bacteria or generation of bubbles, which would tend to be problematic if such a dead space were created, can reliably be prevented, and the pressure of the pressure fluid can be detected with high accuracy.

Further, by using the pressure transmitting body 102 in which the rod-shaped member 104 and the seal member 106 are formed together integrally, the number of parts can be reduced and the structure thereof can be simplified, accompanied by a reduction in the number of assembly steps.

Furthermore, since the sensor element 60 of the pressure sensor 18 can be arranged at a predetermined distance from the flow passage 28 through which the pressure fluid flows, degradation in the detection accuracy of the pressure sensor 18 due to the temperature of the fluid can be prevented, and detection of pressure with high accuracy can be performed.

Still further, since the rod-shaped member 104 of the pressure transmitting body 102 is configured to receive the pressure of the pressure fluid, the seal member 106 does not directly receive the pressure, and a reduction in durability, which would be of concern if the seal member 106 were deformed excessively, can be avoided.

Figure 6:
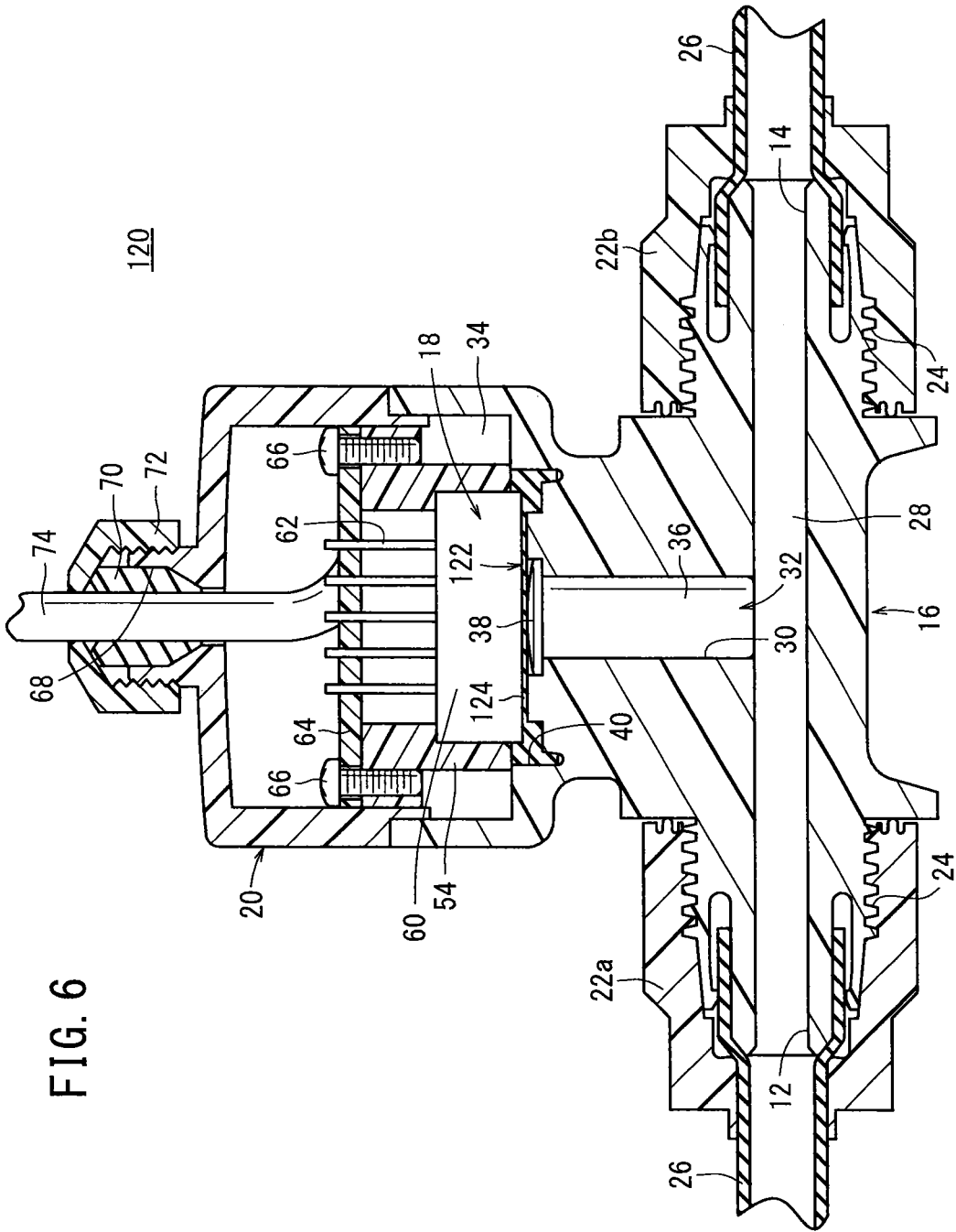
FIG. 6 is an overall cross sectional view of a pressure detector according to a third embodiment of the present invention.

Next, a pressure detector 120 according to a third embodiment is shown in FIG. 6. Constituent elements thereof, which are the same as those of the pressure detector 10 according to the first embodiment, are designated by the same reference characters, and detailed descriptions of such features are omitted.

The pressure detector 120 according to the third embodiment differs from the pressure detectors 10, 100 according to the first and second embodiments, in that a seal member 122 is provided which does not include a hole in the center thereof, and the head 38 of the rod-shaped member 32 is arranged so as to abut against the center of the seal member 122 from below.

As shown in FIG. 6, the pressure detector 120 is equipped with the rod-shaped member 32, which is inserted in the through hole 30 of the body 16 and receives a pressure from the pressure fluid, and a seal member 122, which is provided so as to cover the upper portion of the rod-shaped member 32. The seal member 122 is formed, for example, from an elastic material such as rubber or the like, and is made up from a base section 44 formed in an annular shape, an outer edge section 46 formed on the outer periphery of the base section 44 and which projects perpendicularly with respect to the base section 44, and a thin film shaped skirt section 124 that extends in a radial inward direction with respect to the base section 44. Concerning the rod-shaped member 32, since it has the same structure as the aforementioned rod-shaped member 32 of the pressure detector 10 according to the first embodiment, detailed descriptions thereof are omitted.

In addition, the seal member 122 is mounted on the seal mounting portion 40 of the body 16, such that the head 38 of the rod-shaped member 32, which is inserted in the through hole 30, abuts against the lower surface of the skirt section 124 of the seal member 122.

In the pressure detector 120 constructed in the foregoing manner, when a pressure fluid is made to flow through the flow passage 28 of the body 16, the lower end of the rod-shaped member 32 is pressed upwardly by the pressure of the pressure fluid, whereupon the rod-shaped member 32 is displaced slightly along the through hole 30. As a result, the skirt section 124 of the seal member 122 is pressed upwardly and is flexed by the upper end of the rod-shaped member 32, whereby the sensor element 60 of the pressure sensor 18 is pressed thereby. Based on the pressing force (pressure amount) applied from the rod-shaped member 32 and the seal member 122, an electric signal is output from the sensor element 60 to the circuit board 64 through the terminals 62. Thus, the pressure of the pressure fluid is detected in the pressure sensor 18, and is output externally through the lead wire 74.

In the foregoing manner, with the pressure detector 120 according to the third embodiment, the rod-shaped member 32 is pressed by the pressure of the pressure fluid that flows through the flow passage 28 of the body 16, whereby the sensor element 60 of the pressure sensor 18 is pressed via the skirt section 124 of the seal member 122, which is abutted by the upper end of the rod-shaped member 32, and then the pressure of the pressure fluid is detected. Owing thereto, by insertion of the rod-shaped member 32 in the through hole 30 of the body 16, creation of a dead space in the through hole 30 can be avoided. As a result, pooling of liquid or the occurrence of bacteria or generation of bubbles, which would tend to be problematic if a dead space were created, can reliably be prevented, and the pressure of the pressure fluid can be detected with high accuracy.

Further, since the rod-shaped member 32 and the seal member 122 can be formed separately from different materials, ease of assembly of the pressure detector 120 can be enhanced, and the rod-shaped member 32, for example, can be formed from a suitable material corresponding to the type of pressure fluid that flows through the flow passage 28.

The pressure detector according to the present invention is not limited to the aforementioned embodiments, and it is a matter of course that various additional or modified structures may be adopted therein without deviating from the essential gist of the present invention.

What is claimed is:

1. A pressure detector comprising:
   a body having a flow passage therein through which a fluid flows in a flow direction from an inlet end of the flow passage to an outlet end of the flow passage,
   a sensor chamber provided in the body and in which a pressure sensor is arranged,
   a through hole that extends at an angle to the flow direction, from the flow passage to the sensor chamber, wherein one end of the through hole extends to the flow passage to intersect the flow passage, and
   a pressure transmitting body comprising a shaft disposed in the through hole and displaceable along an axial direction in the through hole, the pressure transmitting body being capable of transmitting a pressure of the fluid to the pressure sensor, one end of the pressure transmitting body extending in the through hole to the intersection of the one end of the through hole with the flow passage, the one end of the pressure transmitting body being constantly exposed to the fluid and having an outer diameter which is substantially the same as the diameter of the one end of the through hole, whereby no dead space is present at the one end of the through hole.

2. The pressure detector according to claim 1, wherein a seal member, which blocks flow of fluid between the sensor chamber and the through hole, is disposed between the through hole and the pressure sensor.

3. The pressure detector according to claim 2, wherein the seal member includes a hole in the center thereof through which the pressure transmitting body is inserted.

4. The pressure detector according to claim 3, wherein another end of the pressure transmitting body abuts against the pressure sensor.

5. The pressure detector according to claim 2, wherein the seal member is formed integrally with the pressure transmitting body.

6. The pressure detector according to claim 2, wherein the pressure transmitting body is disposed on a side of the through hole with respect to the seal member, and transmits the pressure to the pressure sensor via the seal member.

7. The pressure detector according to claim 2, wherein the seal member comprises an annular projection that projects outwardly on at least one of an outer circumferential portion of the seal member and a side surface of the seal member facing toward the body.

8. The pressure detector according to claim 2, wherein the seal member comprises:
   a base section;
   a thin film shaped skirt section retained by the pressure transmitting body; and
   an outer edge section formed on an outer circumferential side of the base section and which is retained by the body,
   wherein the base section is formed between the skirt section and the outer edge section.

9. The pressure detector according to claim 1, the pressure transmitting body comprising:
   a shaft-like main body portion;
   a head formed on another end of the main body portion and having a curved surface, which is expanded radially outwardly with respect to the main body portion, and which projects convexly toward a side of the pressure sensor,
   wherein the pressure sensor is capable of being pressed by the head.

10. The pressure detector according to claim 1, wherein the pressure transmitting body and the seal member are formed from different materials.

* * * * *